United States Patent [19]

Treiber

[11] 4,254,305

[45] Mar. 3, 1981

[54] CURRENT LIMITED SUBSCRIBER LINE FEED CIRCUIT

[75] Inventor: Robert Treiber, Long Island, N.Y.

[73] Assignee: International Telephone and Telegraph Corporation, New York, N.Y.

[21] Appl. No.: 9,992

[22] Filed: Feb. 7, 1979

[51] Int. Cl.³ .............................................. H04B 3/36
[52] U.S. Cl. ............................. 179/16 F; 179/18 FA; 179/70; 179/170 R; 179/170 NC
[58] Field of Search ................... 179/16 F, 18 FA, 70, 179/77, 170 R, 170 NC

[56] References Cited

U.S. PATENT DOCUMENTS

| | | | |
|---|---|---|---|
| 3,903,378 | 9/1975 | Lee et al. | 179/170 R |
| 3,914,560 | 10/1975 | Greene | 179/170 R |
| 4,056,691 | 11/1977 | Freimanis et al. | 179/16 F |
| 4,161,633 | 7/1979 | Trieber | 179/170.2 |

FOREIGN PATENT DOCUMENTS

| | | | |
|---|---|---|---|
| 1299735 | 7/1969 | Fed. Rep. of Germany | 179/16 F |
| 2209593 | 9/1973 | Fed. Rep. of Germany | 179/16 F |
| 2209639 | 9/1973 | Fed. Rep. of Germany | 179/16 F |

*Primary Examiner*—Bernard Konick
*Assistant Examiner*—Randall P. Myers
*Attorney, Agent, or Firm*—John T. O'Halloran; Jeffrey P. Morris

[57] ABSTRACT

The present invention discloses a reduced power dissipation telephone subscriber line feed circuit in which the battery feed current from the central office is determined by the subscriber loop resistance for medium to long loops, and for shorter loops, for which the battery feed current would exceed a given predetermined threshold, the feed current is limited to the threshold value. The invention also relates to compensation for loop and subset attenuation characteristics.

During operation in the current limited mode, attenuation is automatically inserted into the signal transmission and receiving paths in order that normal equalizer operation will not be impaired by current limiting of the battery feed current. A multiple telephone subscriber system is disclosed wherein the circuitry used in deriving current limiting control signals is shared in a multiplexed arrangement by a plurality of subscriber lines. Line feed current is limited in discrete steps to a predetermined threshold value in each subscriber loop upon the detection of an OFF HOOK condition when the feed current drawn by the subset exceeds the threshold value. A plurality of discrete signals are derived by sensing the amount by which the line voltages exceeds a predetermined selected reference voltage value. These discrete signals are used to determine both the effective battery voltage which will produce a d.c. feed current corresponding to the limiting value and the amount of attenuation to be added at the central office by the line circuit to compensate for the equalizer effect in the subscriber set which occurs as a result of the current limiting.

11 Claims, 9 Drawing Figures

CURRENT LIMITED SUBSCRIBER LINE FEED CIRCUIT

BACKGROUND OF THE INVENTION

1. Field of the Invention

The present invention relates generally to telephone subscriber line voltage and current feed circuitry and more particularly to telephone subscriber loop current limiting for reducing power dissipation in the subscriber line feed circuitry while introducing attenuation/gain in the communication paths to maintain normal telephone equalizer operation.

2. Description of the Prior Art

In standard telephone systems, communications are normally transmitted and received over subscriber lines to and from the telephone subscriber subsets over transmission lines having different loop lengths, as determined by the distance of the calling or called subscriber from the appropriate central or local office. Thus, the telephone signals are subject to varying amounts of attenuation depending upon the line impedance of the line in use, which is of course greater for a "long loop" than for a "short loop", and from a d.c. viewpoint, results in decreased battery feed current in the longer loops.

Various prior art techniques are known to provide compensation for variations in subscriber loop length in telephone operation. U.S. Pat. No. 3,823,273 describes the provision of automatic attenuation and equalization in the transmit and receive paths in accordance with subscriber loop length. U.S. Pat. No. 3,903,378 describes a gain control circuit for controlling amplifier gain in accordance with loop length. U.S. Pat. No. 3,914,560 describes a telephone AGC repeater which automatically adjusts AC signal gain to compensate for loop transmission loss. U.S. Pat. No. 4,056,691 describes a telephone subscriber line circuit for supplying a constant current to the subscriber set substantially independent of loop length.

Telephone local and central offices require circuitry for the provision of battery feed current, supervision, signalling and testing, ringing, loop testing and other voltages and currents required by the subscriber station served thereby in providing the requisite subscriber line interface. The battery power (which is a term of art referring collectively to the voltage and current supplied for all of the above functions) and the heat which must be dissipated by the line circuit are important design factors in the interface circuitry, especially when large scale integrated circuits (LSI) are used. It is desirable to minimize the size, cost, battery power and heat dissipated in the subscriber line circuitry.

A telephone subset equalizer, as is well known, includes means for equalizing the gain levels in both the transmitting and receive circuitry of the subset as a function of the subset distance from the central or local office. This is accomplished by circuitry within the equalizer for automatically increasing the gain at the subset when a low d.c. loop current is sensed at the subset by the equalizer. The operating battery voltage supplied from the central office is typically −48 volts and the d.c. loop current which varies with loop length and associated line resistance varies typically between 80 milliamps and 20 milliamps. The equalizer opertion is well known, and consequently is not described in detail herein; however, reference is made to *Transmission Systems for Communication*, Chapter 3, pgs. 50–55 by Bell Telephone Laboratories, 3rd ed. 1964 for a more detailed description of equalizer operation, including schematics of the equalizer circuitry for a standard Western Electric 500-D type telephone, and including curves of the relative response in decibels of the telephone set for various loop lengths, with and without the described equalizer.

Absent regulation, the telephone sound level would increase inversely with the distance of the subscriber set from the central office due to equalizer boost. To eliminate this undesired effect, prior art equalizers limit the sound level after sensing the loop current by controlling the gain of the equalizer amplifiers in the transmit and receive circuits to compensate for the equalizer boost. Such a technique is described by the aforementioned U.S. Pat. No. 3,903,378.

SUMMARY OF THE INVENTION

In accordance with the present invention, a control circuit, which may preferably be situated at a telephone central or local office supplies an optimized d.c. current for the proper operation of one or a plurality of remote telephone subscriber sets substantially independently of the subscriber loop length. This optimization of the d.c. loop current minimizes the power supplied to the telephone subscriber set or sets to no more than that which is actually required for prescribed operation, while also providing the required attenuation/gain characteristic corresponding to the combined loop and remote subset transmission characteristic thereby insuring optimum speech signal levels at the remote subscriber subset and at the central office. The present invention also describes a technique for eliminating the equalization function at the remote subscriber set while performing such equalization automatically at the central office.

In accordance with the present invention, the battery feed current (the line current) is limited to a predetermined value, for satisfactory operation, for example, to 40 milliamps, corresponding to the current required when two standard Western Electric K-500 type telephones are OFF HOOK on the same line, thereby preventing more than 40 milliamps from flowing in the line regardless of the loop length. When this current limiting occurs, the subscriber set equalizer is operable at the 40 milliamp level rather than at the current level which would be present without current limiting, and hence will operate as if it were further away from the current source (the central office battery) than it actually is, i.e. the equalizer will boost the transmitted speech signal to be higher in signal level than it would be for the case in which the current was not limited (normal line feedcurrent). In a similar manner, the subset equalizer boosts the receive speech signal. In accordance with the present invention, to compensate for the equalizer signal boost characteristics, the speech signals transmitted to and received from the subscriber are incrementally attenuated at the line circuit situated in the central office. This attenuation corresponds to the difference in signal levels between the normal operating point and the current limited operating point of the equalizer transmission and receiving characteristics.

The current is limited in steps to the predetermined threshold value when the subscriber set is detected as being OFF HOOK with the current drawn by the subset being greater than needed to power the subset, i.e., when the current exceeds the limiting threshold. Current limiting is achieved by using control signals generated in response to the detection of line current above the threshold value for the purpose of regulating the line voltage coupled to the telephone tip and ring lines. Attenuation/gain is added in the transmit and receive paths, also in steps, to compensate for the equalizer signal boost and in accordance with and to compensate for the equalizer/subset characteristics; or lack thereof if there is no equalizer at all.

The present invention results in reduced power consumption at the central office in the battery feed circuits with consequent savings in cost, energy and space. Further, this power saving is achieved without altering the normal subset equalizer operation. Additionally, by adding attenuation in the transmit and recieve paths, both the transhybrid loss and singing margins in both paths are improved. The present invention is equally applicable to subscriber sets with different characteristics including the application where all equalization is done at the central office, thereby reducing costs of the subset and maintenance thereof.

DESCRIPTION OF THE PREFERRED EMBODIMENT

Figure 1:
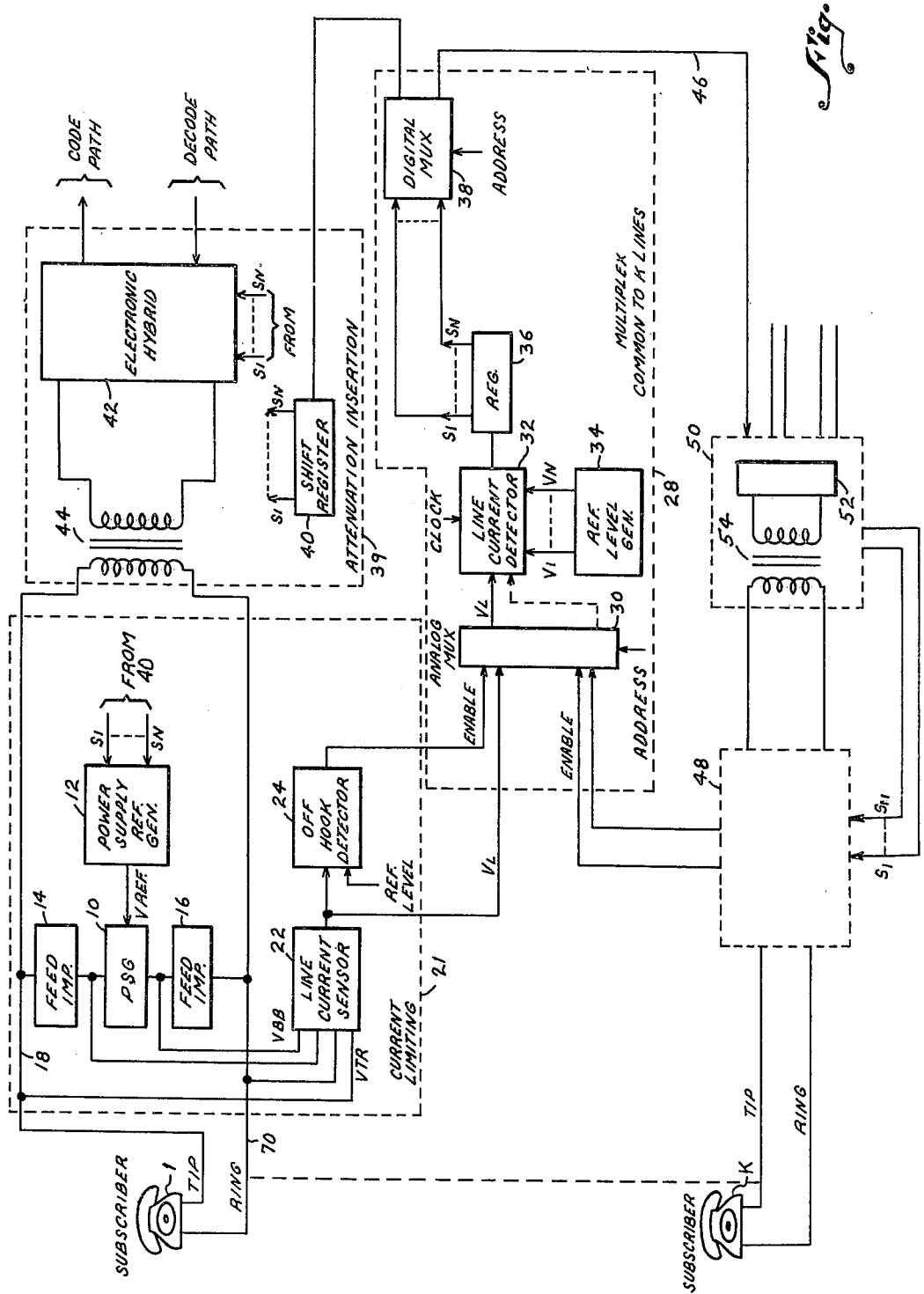
FIG. 1 is a system block diagram of a current limited subscriber line circuit in accordance with the present invention.

Referring now to FIG. 1, a simplified system block diagram of a plurality of current limited subscriber loops is illustrated wherein circuitry common to all of the loops is shared in a time multiplexed arrangement for the purpose of economy. The tip and ring lines from a telephone subscriber set are coupled at the central office to a voltage controllable signal generator 10 for generating the various analog line d.c. and a.c. signalling voltages. The controllable signal generator 10 may comprise, for example a programmable signal generator of the type described by copending application of Robert Treiber, Ser. No. 903,458 filed May 8, 1978, now U.S. Pat. No. 4,161,633, a continuation of Ser. No. 773,713 fild March2, 1977, now abandoned, and assigned to the same assignee as is the present application. Reference may be made to said copending application, and particularly to FIG. 3 thereof, for the details of the design of signal generator 10. The voltage generated by generator 10 is selectively variable in accordance with a reference voltage selection control derived from a power supply reference generator 12, which outputs a plurality of voltage reference levels in accordance with an appropriate input control signal $S_1, S_2, S_3 \ldots S_N$ coupled thereto. Reference generator 12 functions to select an appropriate reference voltage output to be applied to signal generator 10 to limit the d.c. feed current supplied to the tip and ring lines 18 and 20 through feed impedances 14 and 16 respectively by varying the line voltage supplied by generator 10.

A line current sensor circuit 22 senses the voltage output $V_{BB}$ of the programmable signal generator 10 and also senses the voltage across the tip and ring lines $V_{TR}$ and derives a voltage $V_L$ which is proportional to the line current, such that $V_L = V_{BB} - V_{TR}$, and which voltage $V_L$ is coupled to OFF HOOK detector 24 as one input thereto, with the other input thereto being the OFF HOOK reference level, i.e. that voltage which, when exceeded, indicates an OFF HOOK condition.

Digital signals $S_1, S_2 \ldots S_N$, which are generated as a function of the difference between the limiting current value and the sensed line circuit current are generated for each subscriber line in common multiplexing circuitry 28 which is shared by one or more subscriber lines, shown illustratively as subscriber lines 1 through K.

The instantaneous voltage $V_L$ is coupled to an analog multiplexer 30 together with an ENABLE output from OFF HOOK detector 24. The line feed voltages $V_L$ are coupled to a line current detector 32 which can be individually addressed or multiplexed by control logic and similarly a digital output signal is generated for each line in order to control feed voltage and transmission attenuation. This is accomplished for each line by comparing $V_L$ to a series of voltage reference levels $V_1$ through $V_N$ generated in a voltage reference level generator 34. The output of current detector 32 is coupled to a serial to parallel register 36 having a plurality of digital outputs $S_1, S_2 \ldots S_N$ which control the current limiting and attenuation in the transmission path. Thus, when the loop current would normally be greater than 40 milliamps, current limiting will be initiated, but when the loop current is 40 milliamps or less, the loop current is not limited. Current limiting is accomplished by controlling the voltage output of power supply reference generator 12 in accordance with control inputs $S_1, S_2 \ldots S_N$ which correspond to voltages $V_1, V_2 \ldots V_N$ which in turn are selected in accordance with sensed voltage $V_L$ at line current detector 32. Thus, voltage control level outputs $S_1$ through $S_N$ from register 36 are the control inputs to reference generator 12. Reference level control signals $S_1$ through $S_N$ are multiplexed by a digital multiplexor 38 when a plurality of subscriber lines are to be controlled. For each subscriber loop, control values are stored in a dedicated shift register such as shift register 40 for subscriber loop 1.

In addition to limiting the current in the subscriber loop when the 40 milliamp level would be exceeded, attenuation must be added into the loop in both the transmit and receive directions to compensate for the equalizer signal boost at the subset which results from the current limiting. This attenuation is added incrementally, for example, by an electronic hybrid circuit 42 in accordance with the amount of current limiting in both the transmit (code) path and in the receive (decode) path for each subscriber loop. Similarly this attenuation is controlled by the value stored in shift register 40.

Signals on tip and ring lines 18 and 20 may be coupled to and from the hybrid circuit 42 via an audio transformer 44 in a conventional manner.

The multiplex circuitry 28 supplies control signals $S_1$ through $S_N$ to each shift register associated with each pair of multiplexed current sensing lines from the subscriber line. This is shown within the block diagram 28 for subscriber line 1, and control signals are supplied in like manner for other subscriber lines. Control signals $S_1 \ldots S_N$ for subscriber loop K are coupled to loop K via line 46 to current limiting circuitry 48 and to attenuation insertion circuitry 50, including an electronic hybrid 52 and audio transformer 54 of similar configuration as hybrid 42 and transformer 44 of attenuation insertion circuitry 39 and current limiting circuitry 21 described with reference of subscriber loop 1.

Figure 2:
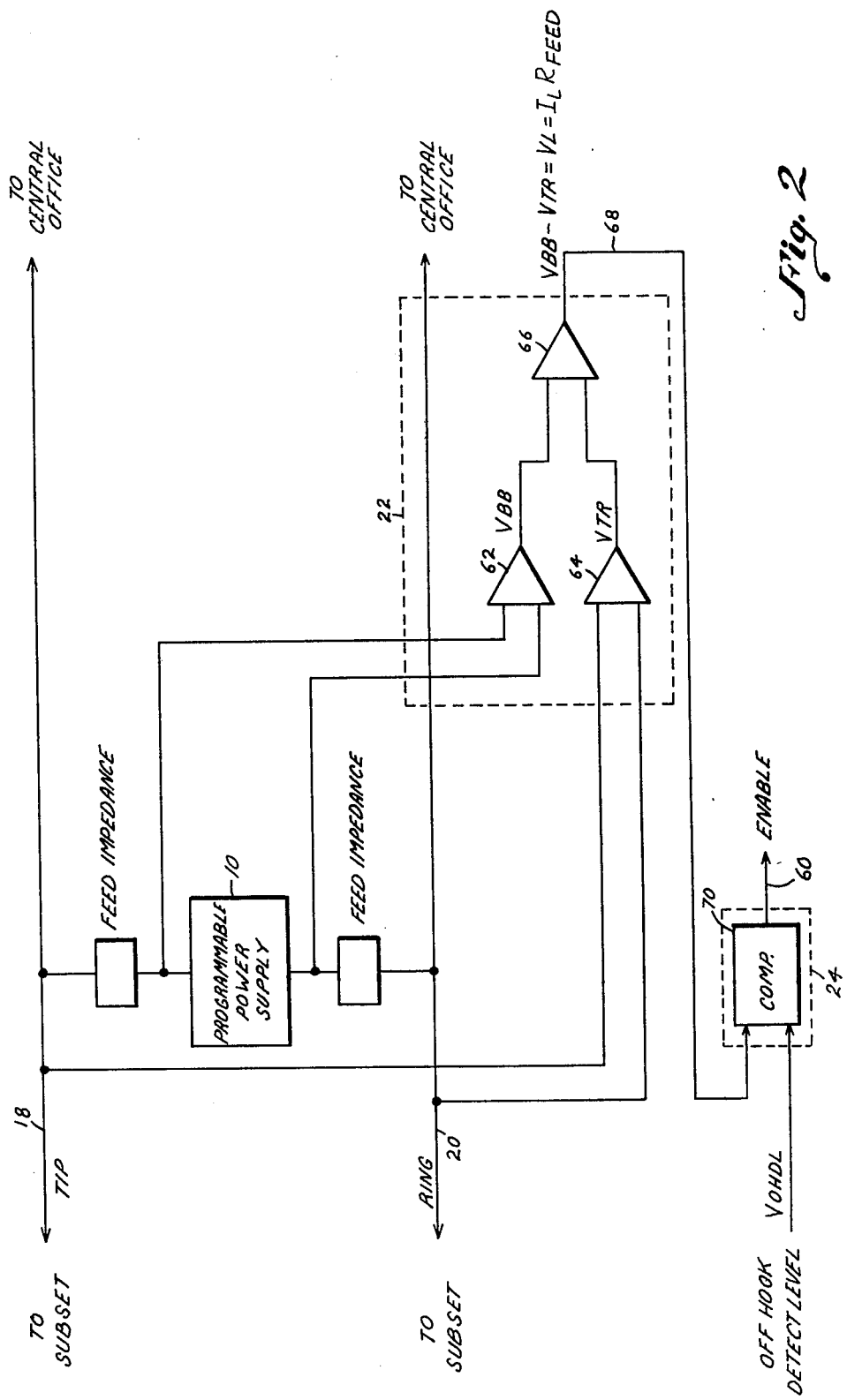
FIG. 2 is a programmable signal generator and associated circuitry for generating regulated subscriber line voltages and detecting an "OFF HOOK" condition.

Referring now to FIG. 2, the line current sensor 22 and associated circuitry are described and the generation of the OFF HOOK detection signal is described. The tip and ring lines 18 and 20 of the subscriber subset may be coupled to the central office via the tip and ring lines 18 and 20 respectively. The OFF HOOK Detect Level, $V_{OHDL}$ is compared with $V_L$ in the comparator 24. When an OFF HOOK is detected, i.e. $V_L$ exceeds $V_{OHDL}$, and ENABLE signal is generated indicating that the d.c. line current has increased due to the subscriber going OFF HOOK. During the period of time the subscriber is "ON HOOK" the normal battery voltage is supplied to the line, i.e. 48 volts. Reference is made to *Transmission Systems for Communication*, Chapter 3, pp. 50-53 for a description of conventional battery voltage supply circuitry.

The variable central office battery voltage $V_{BB}$ which is supplied to the tip and ring lines is also coupled to differential amplifier 62 to derive an output signal representative of the instantaneous value of the battery voltage $V_{BB}$. The voltage across the tip and ring lines, $V_{TR}$ is coupled to differential amplifier 64 to derive an output signal representative of $V_{TR}$. The output signals from differential amplifiers 62 and 64 are coupled to the inputs of another differential amplifier 66, having an output on line 68 representative of $V_L$, which is a voltage proportional to the d.c. line current. Voltage $V_L$, as previously described, is coupled to OFF HOOK detector 24 to generate an ENABLE signal by the subset going OFF HOOK.

Figure 3:
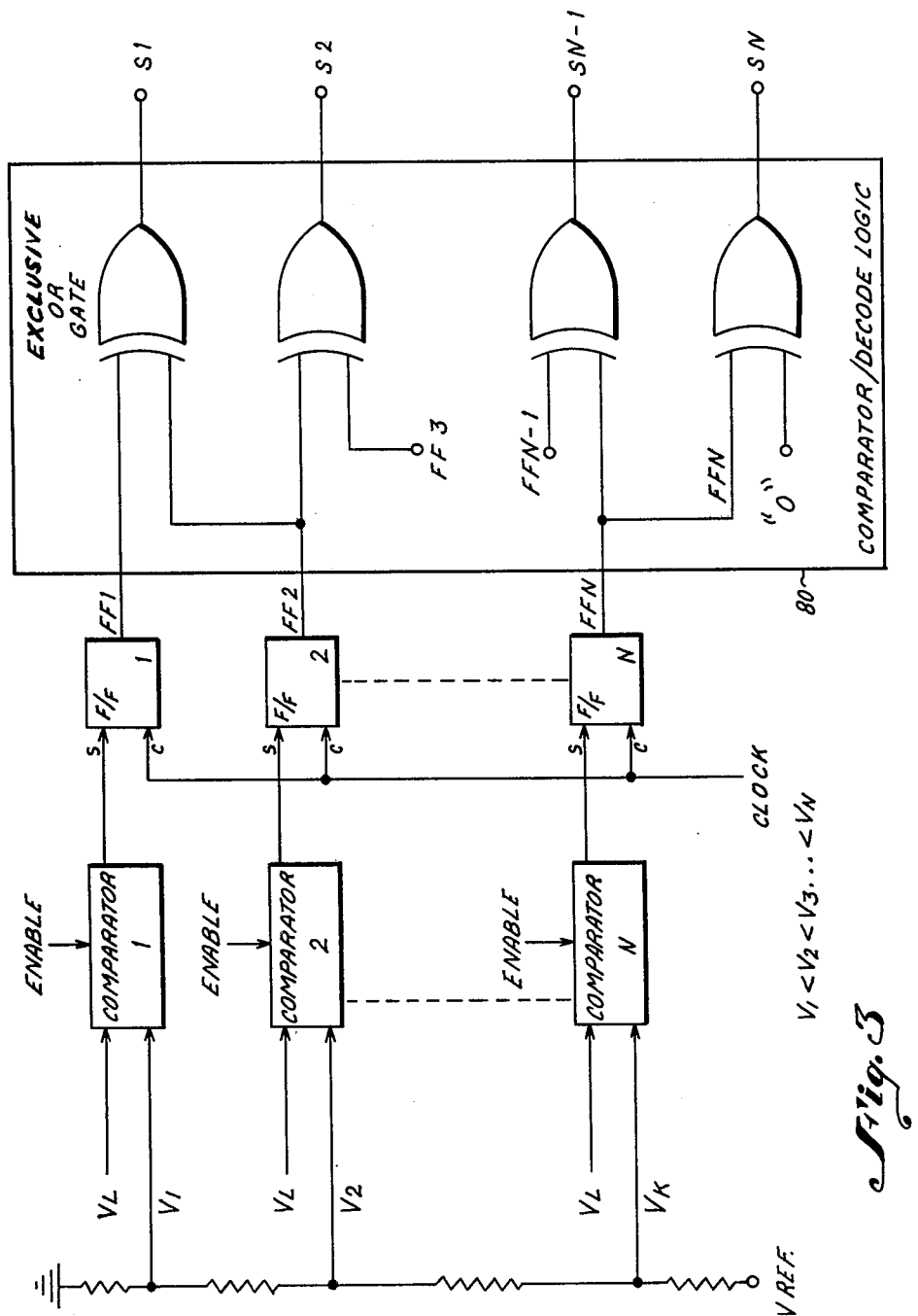
FIG. 3 illustrates a line current detector and voltage reference generation circuit useful in the present invention.

The multiple comparator circuit is described with reference to FIG. 3. The ENABLE signal generated on line 60 by the subset going OFF HOOK is coupled to comparators 1, 2, ... N to enable the comparators to compare the d.c. voltage $V_L$, which is equal to $2R_fI_L$ where $R_f$ is the line feed impedance and $I_L$ is the line current, to a plurality of voltages $V_1, V_2, V_3 \ldots V_N$ derived from a resistive ladder within reference level generator 34 to derive data outputs from those of comparators 1, 2 ... N whose reference voltage levels are exceeded by $V_L$. The outputs of comparators 1, 2, ... N are applied as the signal inputs respectively to flip flops 1, 2, ... N to derive logical outputs FF1, FF2, FFN. The logical outputs of flip flops 1, 2, ... N are applied as the logical inputs to comparator decode logic 80, consisting of a plurality of exclusive OR gates as illustrated having logical outputs $S_1, S_2 \ldots S_{N-1}, S_N$ such that, depending upon the magnitude of $V_L$, one of the N outputs $S_1$ through $S_N$ from comparator decode logic 80 goes positive (logical "1") and all others are logical "0". Thus, for example, when a particular d.c. line voltage $V_L \geqq V_x$, then $S_x$ equals "1". Digital control signal $S_x$ operates as the control input to voltage reference generator 12 shown in FIG. 1 and to the gain control networks associated with the electronic hybrid described with reference to FIG. 7 and which may comprise a standard resistive network of the type illustrated by FIG. 6. The gain control networks serve to insert the appropriate attenuation/gain in the transmit and receive paths through the electronic hybrid.

Figure 4A:
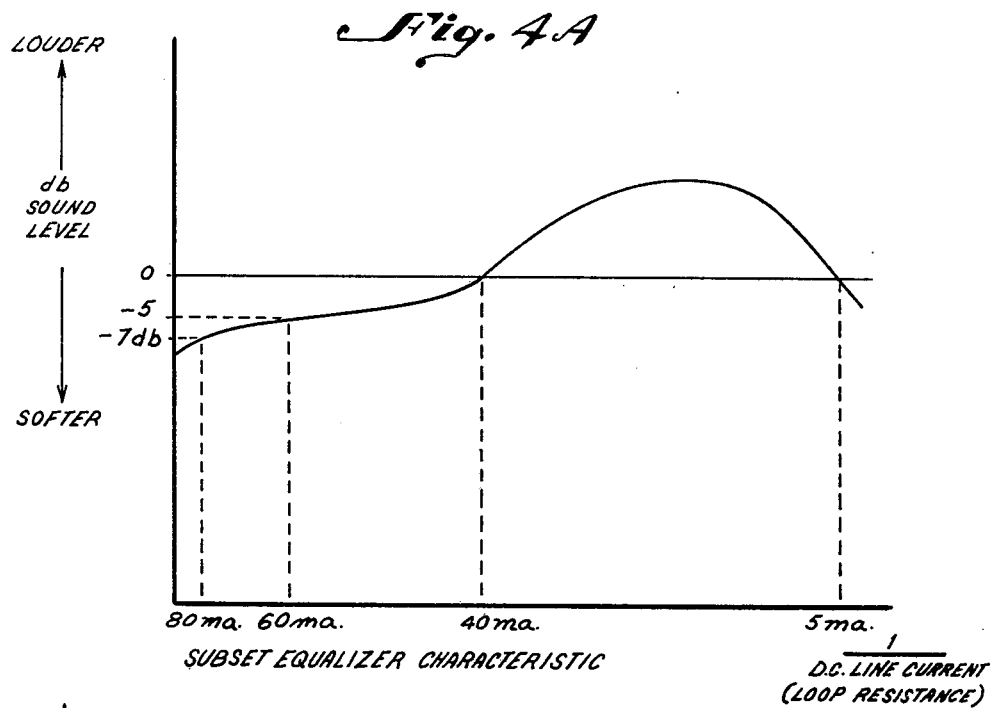
FIGS. 4A, 4B and 4C are graphs illustrative of the operation of the present invention.

Referring now to FIG. 4A, the sound transmission level in decibels for a telephone subset having an equalizer is plotted against the subset line current. A similar curve represents the receive level in decibels in a telephone subset, hence, for simplicity of description, the transmit curve only is illustrated; however, it is to be understood that the description is equally applicable to the operation of the receive path. The subset equalizer reduces the sound level for short loops and increases the sound level for long loops in order that the sound level can be maintained relatively constant regardless of the distance of the subset from the central office controlling a particular call. The sound level thus would be increased with decreasing line current in accordance with adjusting circuitry in the equalizer. For example, assuming a short loop, which might have 800 ohms of loop resistance, 60 milliamps would be drawn from the central office. At 60 milliamps, the output sound level is attenuated by 5 decibels at the subset by the equalizer contained therein. If the current supplied is only 40 milliamps, the equalizer neither attenuates nor amplifies the signal. Thus if the current were limited to 40 milliamps by the central office equipment, when without limiting, the subset would have normally drawn 60 milliamps with a normal battery feed voltage ($-48$ volts), the equalizer would not attenuate and the central office will receive a signal which is 5 decibels too loud.

Figure 4B:
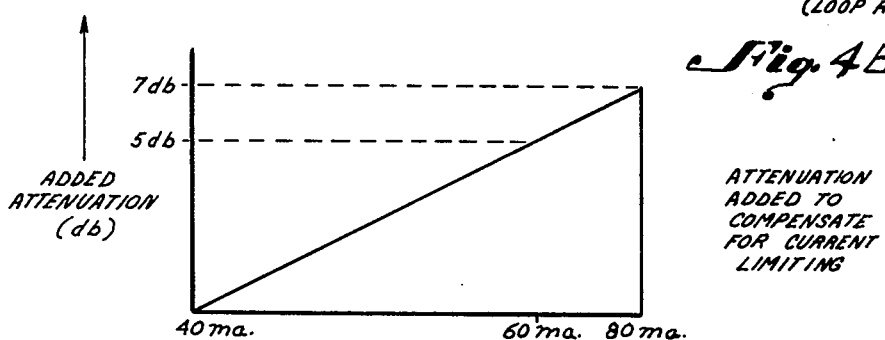

In accordance with the present invention, the programmable power supply 10 will not provide a line voltage which will result in a line current of 60 milliamps, but rather, will provide a line voltage to current limit the line current to the value of 40 milliamps. This causes the equalizer to generate a higher signal level in accordance with its normal operation. Referring to FIG. 4A, at 40 milliamp loop current, limited from 60 milliamp normal loop current, the equalizer output level is at the zero decibel reference level. Thus, for the signal level to be the same as it would be without current limiting, the transmission performance of the subset equalizer must remain the same. To maintain the same transmission performance, the current limited signal must be attenuated by 5 decibels. As shown in FIG. 4B, the higher the line current, the more attenuation must be added to compensate for the equalizer characteristic shown in FIG. 4A. When the line current is less than the value of 40 milliamps, no limiting or attenuation is required. The current is preferably limited incrementally in a series of steps controlled by the programmable reference generator 12. Varying the applied line voltage from programmable signal generator 10 effectively varies the line current. Normally, the current supplied from the conventional central office battery feed increases substantially linearly with decreasing loop length (the reciprocal of loop resistance); hence, the amount that the equalizer boosts the signal level in decibels to operate at the 40 milliamp current limiting point increases with decreasing loop length and more attenuation must be added to compensate for this signal boost.

Referring to FIG. 4B, the portion of the signal level versus line current curve of FIG. 4A between 40 milliamps and 80 milliamps is illustrated to show the increasing difference in signal level in decibels which must be compensated for by added attenuation.

Figure 4C:
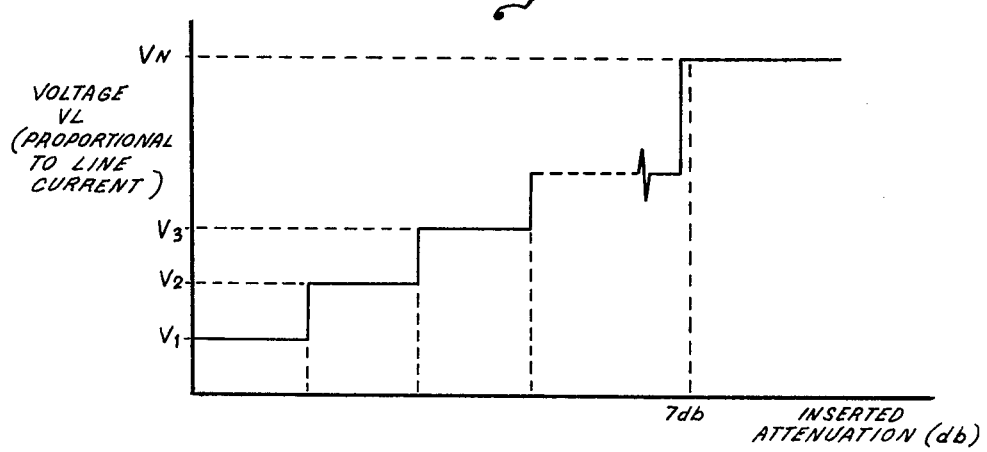

Referring now to FIG. 4C, a graph of inserted attenuation in decibels to compensate for reduced line current from current limiting versus the output voltage reference level of generator 34 is illustrated. As described in the aforementioned copending U.S. patent application Ser. No. 903,458, the line voltage is regulated in accordance with a microprocessor controlled reference voltage. The particular reference voltage may alternatively, and in addition to such microprocessor control, be selectable in accordance with signal inputs $S_1, S_2 \ldots S_N$ thereby limiting the loop current by controlling the value of the reference voltage level used in generating the battery voltage $V_{BB}$ by generator 10. Thus for a given value of reference voltage generated from the power supply reference generator 12, line current is limited in steps and attenuation is inserted in steps based on the equalizer characteristics. The steps correspond to the difference in loop current between the nominal loop current and the current to which the loop is limited.

Figure 5:
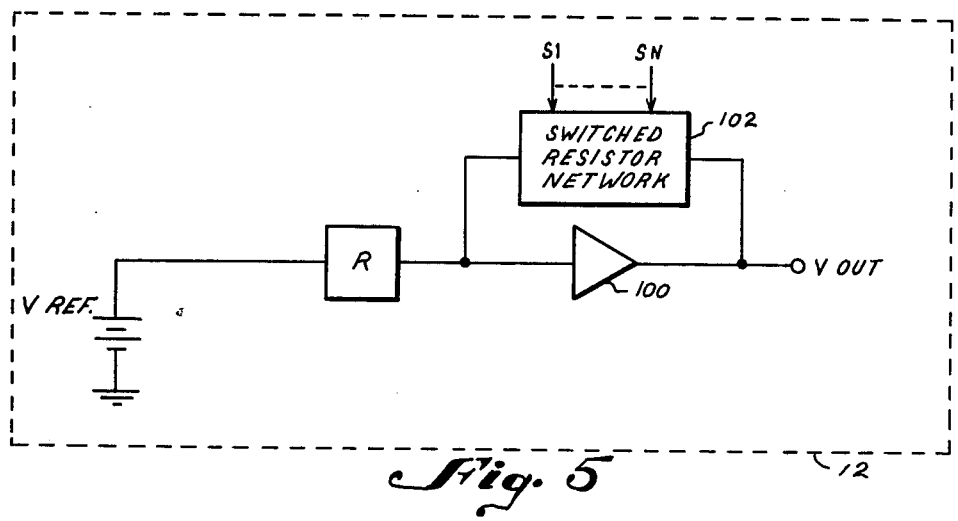
FIG. 5 illustrates the generation of an incrementally variable reference voltage.

Referring now to FIG. 5, a simplified reference voltage selection technique which may be utilized by the power supply reference generator 12 is shown. The voltage output from a conventional amplifier 100 is varied by controlling the gain thereof by means of a switched resistor network 102 such that a d.c. voltage $V_{ref}$ may be varied selectively in accordance with signals $S_1 \ldots S_N$. The output voltage $V_{out}$ is then coupled to programmable signal generator 10 as the reference voltage thereto and from which the d.c. line feed voltage is generated.

Figure 6:
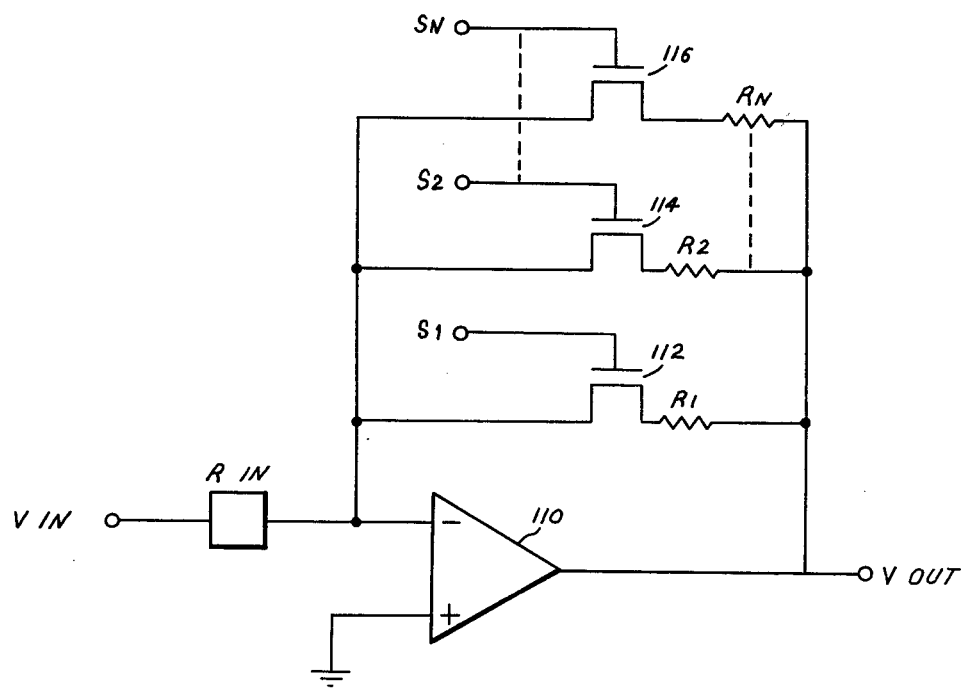
FIG. 6 illustrates a switched resistive network useful in the present invention.

Referring now to FIG. 6, a simplified exemplary switched resistor network is illustrated. Resistances $R_1, R_2 \ldots R_N$ are switched across amplifier 110 in accordance with gate voltage signals $S_1, S_2 \ldots S_N$ applied respectively to the gates of FET's 112, 114 ... 116 respectively, providing selectively controlled gain for amplifier 110. In accordance with the value of the resistance $R_x$ switched across amplifier 110, the output voltage $V_{out}$ is related to the input voltage $V_{in}$ as follows:

$$V_{out} = V_{in} (R)/(R_{in})$$

By using enhancement mode FET's 112, 114, ... 116 there is an effective open circuit between the source and drain electrodes thereof until the source and drain is shorted by the application of the appropriate gate voltage thereto.

Figure 7:
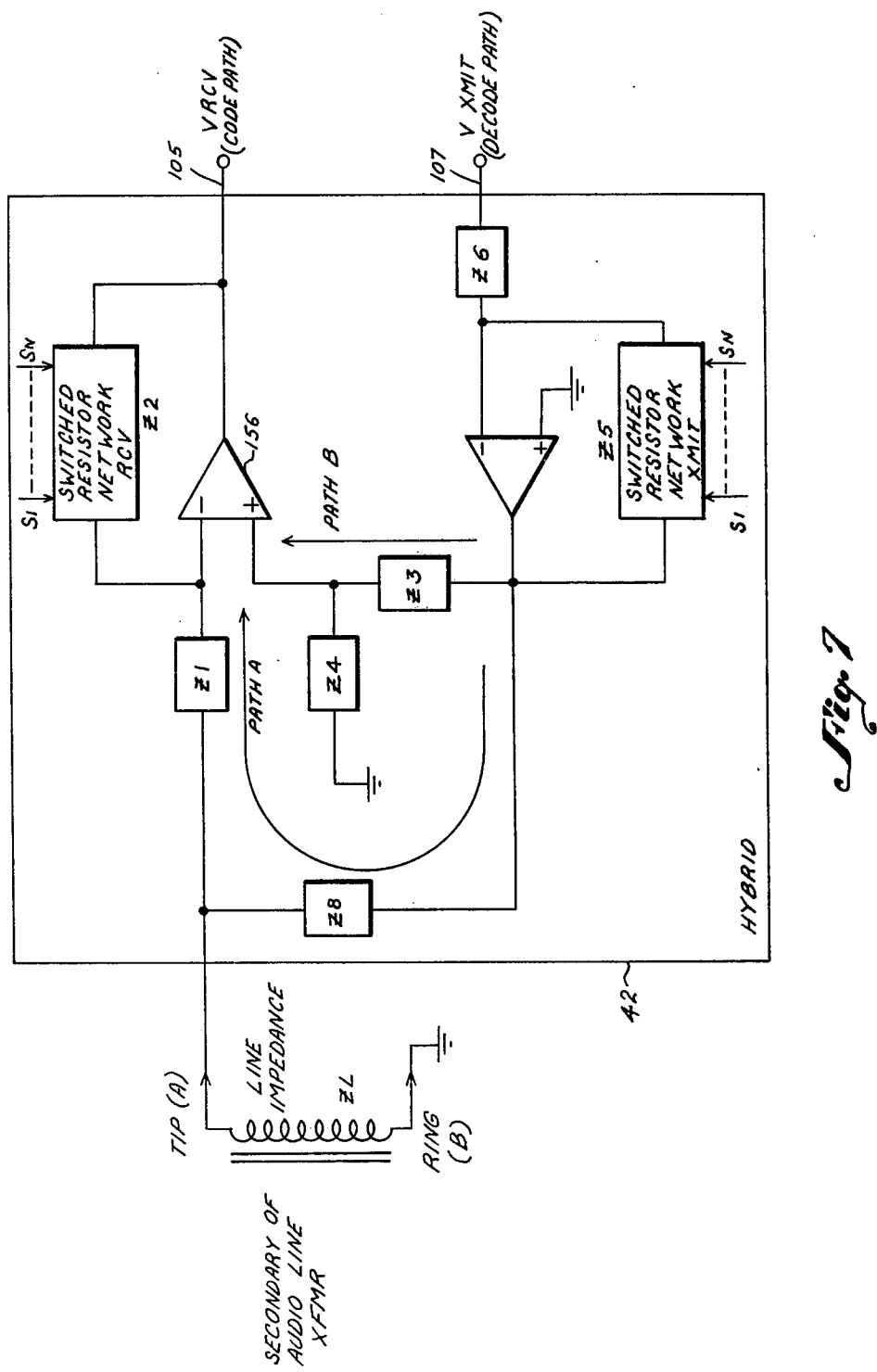
FIG. 7 is a simplified block diagram of an electronic hybrid circuit for isolating the transmit and return transmission paths from each other and for incrementally inserting signal attenuation/gain in the transmit and receive paths.

The number of steps of attenuation to be added in the transmit and receive paths can vary as determined by the subset characteristics and by subjective listener requirements. The circuit described can accommodate as many steps as are necessary. For a typical K-500 Western Electric set approximately three steps would be adequate. One means, by way of example, for inserting such attenuation is as part of the electronic hybrid 42 illustrated generally by FIG. 7. FIG. 7 shows a conventional 2-to-4 wire hybrid in which the current limiting compensation has been included. This circuit's normal function is to cancel or attenuate that portion of the transmit signal $V_{xmit}$ which is returned at 105 $V_{RCV}$. It accomplishes this by proper impedance balancing and termination of the line.

Ordinarily, two sets of impedance values are required for impedances Z3 and Z4 to accommodate short, normal and loaded subscriber loops. Isolation of the transmit and receive signals on the tip and ring lines and on lines 105 and 107 to the encoder and from the encoder (not shown) is achieved by balancing the circuit impedances such that signals on paths A and B cancel each other at the output of operational amplifier 156 on the receive side. Impedance Z8 is chosen from two or more possible values to attempt to match the line impedance Z1. Impedances Z3 and Z4 are chosen to compensate for the return loss characteristics for the mismatch between Z8 and Z1. If impedance Z8 is made to equal the line impedance Z1, then impedances Z1, Z2, Z3 and Z4 can be entirely resistive elements which need not be varied for different loop lengths, with consequent elimination of undesirable signal reflection due to line impedance mismatch.

While the present invention has been described in connection with a preferred embodiment thereof, it is to be understood that additional embodiments, modifications and applications which will become obvious to those skilled in the art are included within the spirit and scope of the invention as set forth in the claims appended hereto.

I claim:

1. An automatic signal equalization circuit for remotely providing an optimized d.c. current to one or more telephone subscriber sets independently of the subscriber loop length and the presence or absence of an equalizer at said subscriber sets comprising:

signal generation means for supplying a regulated d.c. voltage to the telephone tip and ring lines in accordance with a controllable reference voltage signal;

means for sensing the subscriber line current when a subscriber set is in the OFF HOOK condition and for generating a digital logic signal related to the amount by which said sensed line current exceeds a predetermined threshold signal;

means responsive to said logic signal for incrementally varying said reference voltage signal to regulate the d.c. voltage across the tip and ring lines such that said line current is limited to said threshold; and means responsive to said logic signal for incrementally varying the attenuation in the subscriber loop to optimize the transmission characteristics of the subscriber loop and telephone subset.

2. An automatic signal equalization circuit in accordance with claim 1 wherein said means for varying the attenuation in said subscriber loop includes means responsive to said logic signal for incrementally varying the gain in said subscriber loop.

3. An automatic signal equalization circuit in accordance with claim 2 wherein said means for incrementally varying said attenuation and said gain in such subscriber loop includes means for inserting either attenuation or gain in both the transmit and receive paths of said subscriber loop.

4. An automatic signal equalization circuit in accordance with claim 2 wherein said means for incrementally varying said attenuation and said gain is included within a two-to-four wire hybrid conversion means said hybrid being coupled to said tip and ring lines for providing isolation between said transmit and receive paths, and said hybrid means including:

first and second gain control means in said transmit and receive paths respectively, each of said gain control means being responsive to said digital logic signal for providing gain control; and gain control amplifier means responsive to said logic signal for varying the gain in said transmit and receive paths, whereby communication signal power in said transmit and receive paths is optimized as a function of the loop length and transmission characteristics of the subscriber set.

5. An automatic signal equalization circuit in accordance with claim 1 wherein said signal generation means includes a programmable reference generator for selecting a voltage reference signal from a plurality of reference voltage signals in response to said logic signal.

6. An automatic signal equalization circuit in accordance with claim 5 wherein said programmable reference generator includes processor means for controlling said reference voltage signals in response to digital control signals derived by said processor.

7. An automatic signal equalization circuit in accordance with claim 5 wherein said means for sensing the subscriber line current includes:

detector means for generating an ENABLE signal when a subscriber set is in the OFF HOOK condition means for comparing the subscriber line voltage with a plurality of reference voltage signals, said comparing means being enabled by said ENABLE signal to generate an output control signal proportional to the value of the particular one of said plurality of reference voltage signals which is exceeded by said subscriber line voltage; and means for coupling said output control signal to said signal generation means for incrementally varying said reference voltage signal in response to said output control signal.

8. An automatic signal equalization circuit in accordance with claim 1 further comprising:

multiplexing means coupled to a plurality of said means for sensing subscriber line current from a plurality of subscriber lines and for generating a plurality of multiplexed output control signals respectively for said plurality of multiplexed subscriber lines; and means for demultiplexing said multiplexed control signals for each of said multiplexed subscriber lines for regulating the d.c. voltage on the tip and ring lines of each of said subscriber lines in accordance with the sensed current on each of said subscriber lines.

9. A current limited subscriber line feed circuit comprising:

signal generation means for supplying a regulated d.c. voltage to the telephone tip and ring lines in accordance with a controllable reference voltage signal;

means for sensing the subscriber line current when a subscriber set is in the OFF HOOK condition and for generating a digital logic signal related to the amount by which said sensed line current exceeds a predetermined threshold signal;

means responsive to said logic signal for incrementally varying said reference voltage signal to regulate the d.c. voltage across the tip and ring lines such that said line current is limited to said threshold; and means responsive to said logic signal for incrementally inserting either attenuation or gain in the subscriber line to compensate for signal loss due to differences in subscriber loop length.

10. A current limited subscriber line feed circuit in accordance with claim 9 wherein said line feed circuit is coupled to the subscriber loop at the telephone central office, whereby a subscriber set equalizer may be eliminated.

11. A current limited subscriber line feed circuit in accordance with claim 9 wherein said means for incrementally inserting either attenuation or gain includes means for inserting said attenuation or gain in both the transmit and receive paths of said subscriber loop.

* * * * *